United States Patent
Blomberg et al.

[11] Patent Number: 5,860,773
[45] Date of Patent: Jan. 19, 1999

[54] DRILLING TOOL WITH ROUNDED INSERT SUPPORT SURFACES

[75] Inventors: Torsten Blomberg, Sandviken; Lars Sandberg, Upsala, both of Sweden

[73] Assignee: Sandvik AB, Sandviken, Sweden

[21] Appl. No.: 750,621

[22] PCT Filed: May 31, 1995

[86] PCT No.: PCT/SE95/00615

§ 371 Date: Feb. 24, 1997

§ 102(e) Date: Feb. 24, 1997

[87] PCT Pub. No.: WO95/34397

PCT Pub. Date: Dec. 21, 1995

[30] Foreign Application Priority Data

Jun. 13, 1994 [SE] Sweden .................................. 9402036

[51] Int. Cl.[6] .................................................. B23B 51/00
[52] U.S. Cl. ............................ 408/83; 408/199; 408/224
[58] Field of Search .................................... 408/223, 224, 408/83, 144, 227, 231, 199

[56] References Cited

U.S. PATENT DOCUMENTS

| | | |
|---|---|---|
| 4,108,567 | 8/1978 | Faber . |
| 4,215,957 | 8/1980 | Holma et al. . |
| 4,768,901 | 9/1988 | Reinauer et al. . |
| 5,302,059 | 4/1994 | Fabiano . |
| 5,302,060 | 4/1994 | Nystrom et al. . |

FOREIGN PATENT DOCUMENTS

| | | | |
|---|---|---|---|
| 2 316 762 | 10/1974 | Germany . | |
| 2910828 | 9/1980 | Germany | ................................ 408/227 |
| 206956 | 2/1984 | Germany | ................................ 408/223 |
| 186022 | 11/1963 | Sweden | ................................. 408/227 |
| 347 450 | 8/1972 | Sweden . | |
| 468 930 | 4/1993 | Sweden . | |
| 2180177 | 3/1987 | United Kingdom | ................... 408/233 |
| 94/15740 | 7/1994 | WIPO . | |

*Primary Examiner*—Daniel W. Howell
*Attorney, Agent, or Firm*—Burns, Doane, Swecker & Mathis, L.L.P.

[57] ABSTRACT

A drilling tool includes a drill body having axially spaced front and rear ends. The front end includes tangential pockets for carrying cutting inserts spaced by respective radial distances from a center axis of rotation of the drill body. Two chip canals are formed in the front end surface adjacent respective pockets for conducting away chips. The canals are interconnected by a chip space located rearwardly of the front surface, to form in the drill body a bridge which extends diametrically and carries a plurality of the pockets. Each insert pocket includes an axially extending abutment surface against which a rear wall of a respective insert engages. Each of the abutment surfaces and rear walls is of semi-circular shape.

12 Claims, 3 Drawing Sheets

2

5,860,773

DRILLING TOOL WITH ROUNDED INSERT SUPPORT SURFACES

RELATED INVENTION

This is a continuation of International Application No. PCT/SE95/00615, filed May 31, 1995, which designated the United States. The invention is related to that disclosed in concurrently filed U.S. application Ser. No. 08/750,617 (WO 95/34398).

BACKGROUND OF THE INVENTION

The present invention relates to a drilling tool for the chip-breaking machining of metallic materials, especially for so-called ejector drilling. However, it may also advantageously be used for so-called BTA-drilling.

It is known to use cutting inserts of cemented carbide for drills, which inserts are fastened by mechanical fastening arrangements, the inserts being provided with one or more recesses in the chip surface for chip-breaking purposes. Such drills are, for instance, known from U.S. Pat. No. 4,215,957. However, it has turned out to be difficult to attain an optimal forming of the chips. That is, it has been impossible to attain the desired short, comma-shaped chips, at the same time as it has been impossible to reduce power consumption when running the drill in the desired way.

Further, in U.S. Pat. No. 5,302,060 drilling tool is described comprising a drill body on which two or more cutting inserts are mounted. The inserts are substantially formed as trapezoids and are axially mounted, i.e., the abutment surfaces of the cutting inserts extend axially, the inserts suitably being fixed by brazing. This makes the brazing of the inserts more difficult, since accessibility to the inserts in the axial direction is considerably reduced in the chip flute or canal. Moreover, during manufacture of the drill body it is difficult to position a milling tool downwardly into the chip flute in cases when the insert seats or pockets are to be milled out. A further drawback with this construction is that the axial extension of the inserts are bulky and that the chip flutes or canals become long, and this increases the risk of chip jamming. Furthermore, the long chip flutes have the consequence that one has to mill relatively deeply, with large over-hangs resulting.

In U.S. Pat. No. 4,768,901 a drilling tool is disclosed having a tangential positioning of the drilling inserts on the upper or end-side of the drill head. Admittedly, this has made possible shorter chip flutes and, consequently, a decreased risk for chip jamming. On the other hand, the drill inserts and/or the tangential insert seats is/are unnecessarily complicated. Thus, the inserts shown in FIG. 3 of this citation are apt to break, on one hand because of the included 90° angles which function as kerfs, and on the other hand because of the complicated geometry, which causes compacting problems when the inserts are pressed. Moreover, the formation of insert seats necessitates a relatively complicated and very precision-demanding milling operation in order to obtain a satisfactory abutment of the seat against the insert, particularly since the latter is fastened by screws and not by solder.

Thus, a primary object of the present invention is to provide a drilling tool that is easy to manufacture.

A second object of the present invention is to simplify, as far as possible, the production of the insert pockets in a drill head, particularly in an ejector drill head, and also simplify the production of the cutting inserts, particularly by avoiding all compacting problems when pressing them.

Another object of the present invention is to reduce the number of different cutting insert designs to a minimum, in particular to only one design.

SUMMARY OF THE INVENTION

These and further objects have been attained in a surprising way by providing a drilling tool which comprises a drill body of generally cylindrical shape defining a central axis of rotation and having axially spaced front and rear end surfaces, and a passage extending axially into the body from the rear end surface. A plurality of tangential insert pockets is formed in the front end surface, the pockets being adapted to receive respective cutting inserts. Each pocket includes a generally axially extending abutment surface which is rounded as viewed in a direction parallel to the axis.

BRIEF DESCRIPTION OF THE INVENTION

For illustrative but non-limiting purposes, a preferred embodiment of the invention will now be further described with reference to the appended drawings wherein.

DETAILED DESCRIPTION OF THE PREFERRED EMBODIMENT

Figure 1:
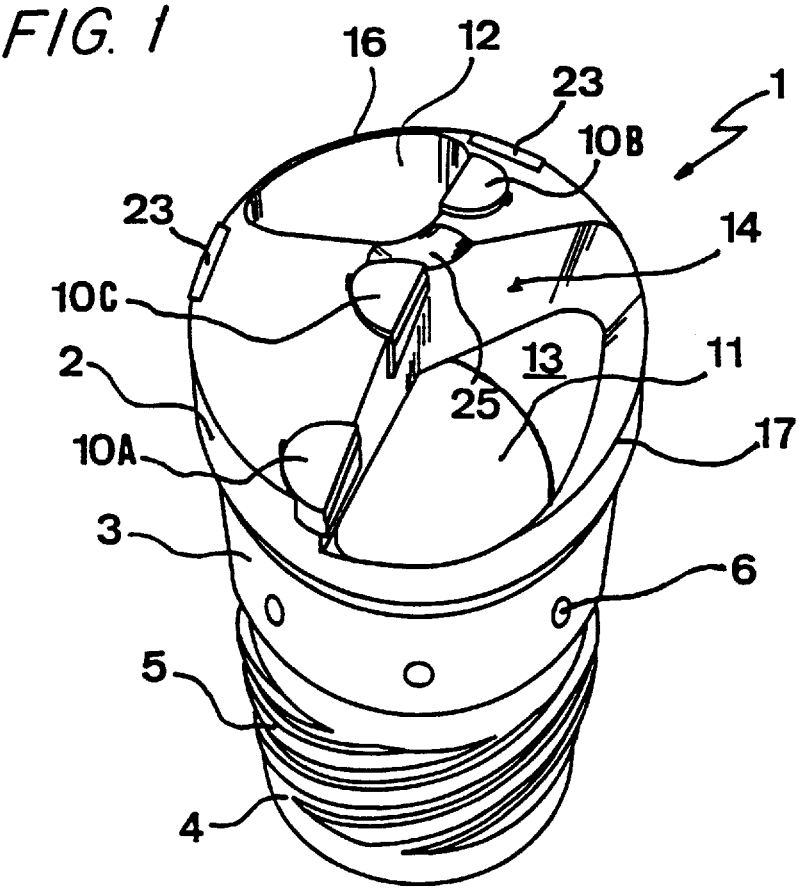
FIG. 1 shows a drilling tool according to the invention in a perspective view obliquely from above.

In FIG. 1, a drilling tool of the ejector type is generally designated by reference numeral 1. Advantageously, the tool may also be generally used for so-called BTA-drilling. The tool comprises a front drilling crown or head 2, an intermediate part 3 and a shaft 4. The shaft 4 is provided with an outer screw thread 5, which is intended, in a way known per se, to be threaded into an outer tube (not shown). An inner tube (not shown) that is concentrical with the outer tube would be inserted in a way known per se into an inner, substantially cylindrical cavity or passage 15 of the drill, extending past a plurality of cooling medium holes 6, whereby formed chips entrained in the cutting medium travel through the inner tube via chip canals 11 and 12.

Figure 3:
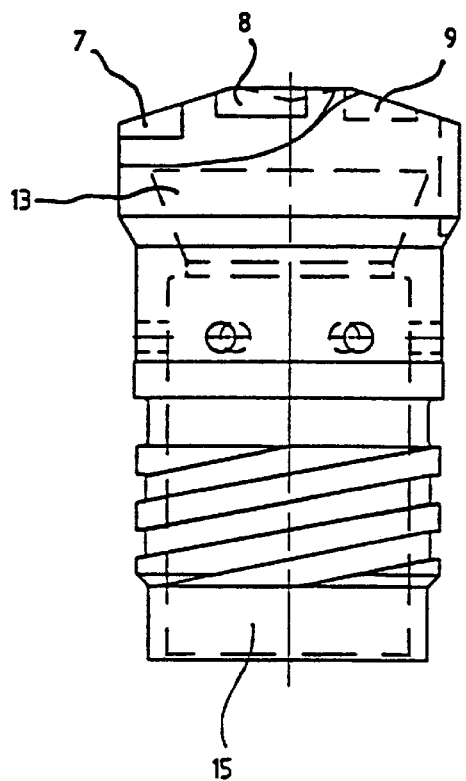
FIG. 3 shows the same drilling tool as in FIG. 1 in a side view without the inserts.
Figure 4:
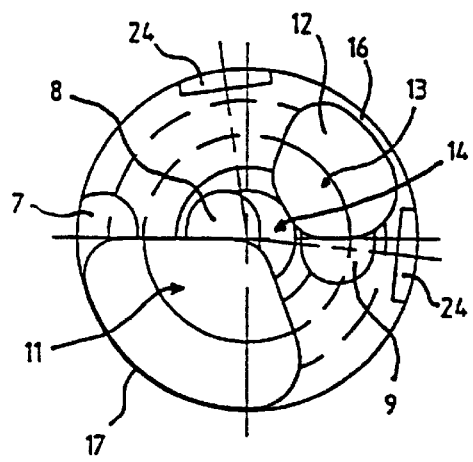
FIG. 4 shows the drilling tool straight from above.
Figure 5:
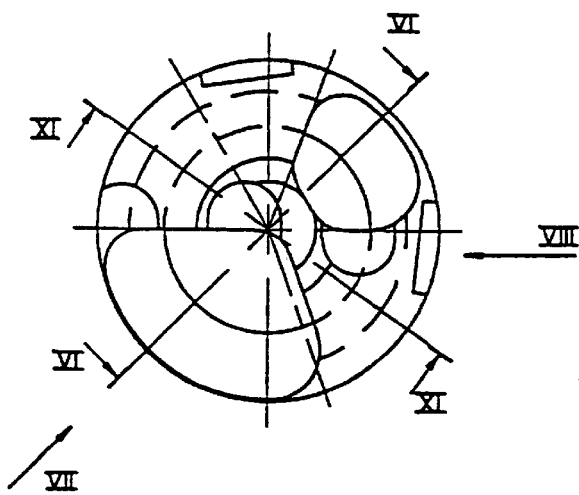
FIG. 5 shows the same view as FIG. 4, and further including section lines defining the views of FIGS. 5 to 8.

As may be seen in FIGS. 3 and 4, the top side of the drill head is provided with three cutting insert seats or pockets 7, 8 and 9 each intended to accommodate a drill cutting insert. Advantageously, the three cutting inserts 10A, 10B, 10C are identical, the only difference being that the central cutting insert 10C is reversed in comparison to the peripheral and intermediate cutting inserts 10A and 10B, respectively. The number of cutting inserts in an ejector drill may be between one and five. However, the disadvantage with only a single cutting insert is that the cutting forces that the support pads have to endure become large since the drill becomes unbalanced.

It has been found that the use of three inserts is a good compromise between complexity, life and out-balancing.

Figure 2:
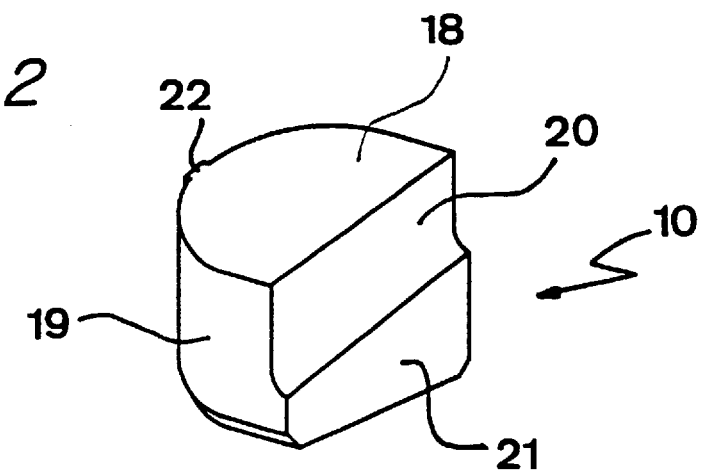
FIG. 2 shows a drill cutting insert according to the invention in a perspective view obliquely from above.

The ejector drill is usually produced as a one-way drill, and the cemented carbide inserts according to FIG. 2 are therefore soldered or brazed in the cutting pockets. Since it is of one-way type, the drill should be worn as long as possible without the product quality and the break-down risk becoming disturbing.

The peripheral insert 10A determines the diameter of the drilled hole, which is usually between 20 and 65 mm. The cutting edge PE of this peripheral insert 1OA is linear and inclined upwardly (i.e., axially forwardly) as the cutting edge progresses radially inwardly. The adjacent central cutting insert 10C disposed in the cutting pocket 8 is arranged to overlap the center axis of the drill, since no core is desired to remain in the workpiece. Contrary to the peripheral insert 10A, the cutting edge CE of the central insert 10C is inclined downwardly (i.e., axially rearwardly) as the cutting edge progresses radially inwardly, since otherwise the trailing cutting insert 10B would be submitted to such a large stress that it would very soon break. In agreement with the above-described inclination of the central cutting edge CE, the tip of head 2 is provided with a conical recess 25. On the opposed side of the central axis A, the intermediate cutting insert 10B is disposed in the insert pocket 9. Like the peripheral insert 10A, the cutting edge IE of the intermediate insert is inclined upwardly (i.e., axially forwardly) as the cutting edge progresses radially inwardly.

During rotation of the tool, the revolution path of the cutting edge IE of the intermediate insert overlaps somewhat with both the cutting edges of the peripheral and the central cutting inserts, in order to obtain a continuous cutting line from the central axis to the periphery.

Figure 6:
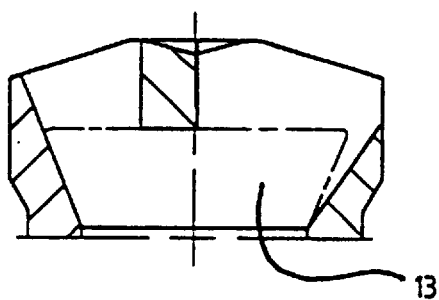
FIG. 6 shows a cross-section taken along line 6—6 in FIG. 5, of only the upper part of the tool.
Figure 7:
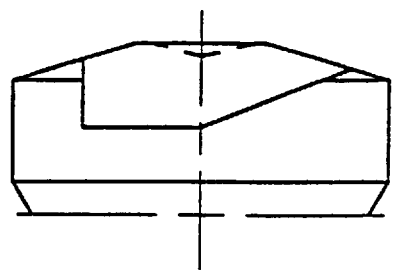
FIG. 7 shows a side view taken in the direction of arrow 7, of only the upper part of the tool.
Figure 8:
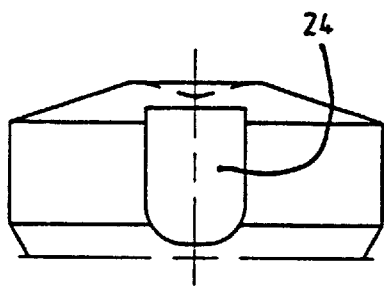
FIG. 8 shows a side view taken in the direction of arrow 8 in FIG. 5, of only the upper part of the tool.
Figure 9:
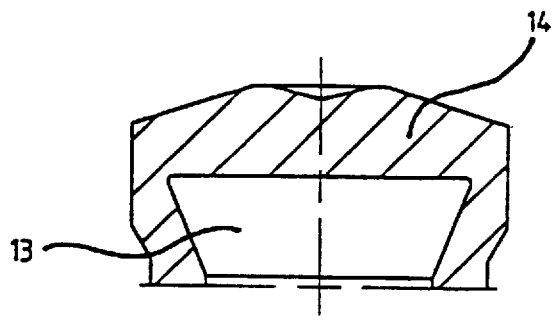
FIG. 9 shows a cross-section taken along line 9—9 in FIG. 5, of only the upper part of the tool.

The two chip canals, ducts or flutes 11 and 12 terminate in the top side of the drill. The larger chip canal 11 services the peripheral and the central inserts, and the somewhat smaller chip canal 12 services the intermediate cutting insert. In conformity with a preferred embodiment of the present invention, the opposed, lower ends of these chip canals are connected to one another by means of an inner chip space 13 located at a distance below the crown 2. Thus, the crown 2 and a ceiling 30 of the chip space 13 form therebetween a bridge 14 which extends over the space 13 and is connected to two diametrically opposite the parts of the top (front) end of the drill. The chip space 13 is of generally frustoconical shape which narrows in a downward (i.e. axially rearward) direction as can be seen in FIG. 9 and in phantom lines in FIG. 6. Due to this chip space 13, the central and intermediate cutting inserts 10C, 10B will be mounted on the bridge 14.

Since the whole drill 1 is preferably made in one single piece, the space 13 is formed by a turning tool introduced through the opening or substantially cylindrical cavity 15 formed in the rear end of.the drill. This space 13 results in several advantages, of which may be mentioned increased chip space with minimized risk for chip jamming, and a lighter drill weight. The chip canals 11 and 12 have been milled out from above, i.e., from the drill's top side. In order to optimize the available chip space in the chip flutes, the milling tool has been angled relative to the central axis A of the drill, adjacent to the periphery of the drill, so that outwardly angled, bevelled surfaces 32 have been obtained, which adjoin either the immediate proximity of the outer envelope surface of the drill via a small land portion at the canal 12, or which directly form a break line 17 with that envelope surface at the canal 11.

The drilling tool according to the invention is preferably produced of one single piece. The external, rotation-symmetrical surfaces are made by turning while the other external surface portions are formed by milling. As best seen in FIGS. 3 and 4, each of the insert pockets 7, 8 and 9 includes a rear abutment surface 7A, 8A, 9A extending axially. The pockets 7, 8, 9 are made in the simplest possible way, namely by one single short, straight end milling operation per insert pocket, with one and the same end mill. Thus, the rear abutment surface of the insert pocket of course gets a.rounded, semi-circular shape corresponding to the cutting diameter of the end mill which forms the pocket. The inner cavity 15 is bored-out, whereafter, as mentioned above, the chip space 13 is formed by turning a forward end of the cylindrical cavity 15.

As mentioned, FIG. 2 reproduces a cutting insert 10 according to the present invention. Inter alia, the insert comprises a relief surface 18 and a rounded rear wall 19. The chip surface comprises an extended chip breaker 20 and below that a substantially planar chip surface portion 21. On the rounded rear wall of the cutting insert, there is provided a distance knob 22 which sets aside any interferences when positioning the insert in the insert pocket due to unevenness that may arise when the inserts are pressed. Moreover, the distance knob 22 minimizes the risk for any positioning discrepancies caused by a varying thickness of the solder layer, due to the fact that the contact between the two opposed semi circle-shaped surfaces becomes minimal.

The rounded rear wall of the cutting insert gives a considerably reduced risk for the formation of cracks, since it permits a favorable stress pattern without any sharp corners which involve stress concentrations. Further, since the length of the insert is large in comparison to the insert width, a larger support is obtained for taking up cutting forces. Moreover, the insert behaves very favorably during the pressing per se and does not cause any compacting problems whatsoever.

In order to absorb radial cutting forces, the drill according to the invention is equipped with support pads 23 which are soldered or brazed in support pad pockets 24. Also, these support pad pockets are suitably milled out by a single straight milling operation with an end mill, in the same way as the insert pockets 7, 8 and 9. The support pad may suitably have a matching shape, i.e., an elongated body with parallel long sides 38 and a rounded end surface 40. Furthermore, the outer side of the support pad is suitably given a rounded shape, i.e., the shape of a cylinder surface segment, in order to substantially conform to the substantially cylindrical envelope surface of the drill.

During the mounting of the inserts and the support pads, the rounded rear abutment surface of the respective pockets functions as a guide during the initial stage of the mounting, i.e., it permits a certain displacement laterally, which is a necessity for automated mounting operations.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

We claim:

1. A drilling tool comprising a drill body of generally cylindrical shape defining a center axis of rotation and having axially spaced front and rear end surfaces, and a passage extending axially into the body from the rear end surface; a plurality of tangential insert pockets formed in the front end surface and adapted to receive respective cutting inserts; each pocket including a generally axially extending abutment surface which is rounded as viewed in a direction parallel to the axis.

2. The drilling tool according to claim 1 wherein each pocket is of substantially semi-circular shape as viewed in a direction parallel to the axis.

3. The drilling tool according to claim 1 wherein the insert pockets are three in number and are located at respective radial distances from the axis to define a center pocket, an intermediate pocket, and a peripheral pocket.

4. The drilling tool according to claim 3 wherein first and second chip canals are formed in the front end surface and communicate with the passage for conducting chips, the first chip canal disposed adjacent the center pocket and the peripheral pocket; the second chip canal disposed adjacent the intermediate pocket.

5. The drilling tool according to claim 4 wherein the first and second chip canals are interconnected by a chip space leading to the passage; the chip space disposed rearwardly from the front end surface, whereby a generally diametrically oriented bridge is formed by the front end surface and a ceiling of the chip space, the bridge extending between two diametrically opposed portions of the front end surface; at least the center and intermediate pockets disposed in the bridge.

6. The drilling tool according to claim 5 wherein the chip space has a generally frusto-conical shape which narrows in an axially rearward direction.

7. The drilling tool according to claim 4 wherein first and second chip canals are formed in the front end surface and communicate with the passage for conducting chips; the first and second chip canals being disposed adjacent respective pockets and being interconnected by a chip space leading to the passage; the chip space disposed rearwardly from the front end surface, whereby a generally diametrically oriented bridge is formed by the front end surface and a ceiling of the chip space.

8. The drilling tool according to claim 7 wherein two of the pockets are formed in the bridge.

9. The drilling tool according to claim 1 wherein the drill body comprises a one-piece member.

10. The drilling tool according to claim 1 wherein the drill body includes an outer envelope surface extending from the front end surface to the rear end surface; at least one recess formed in the envelope, the recess including a pair of parallel long sides interconnected by a substantially semi-circular end surface, the long sides extending parallel to the axis; and a support pad affixed in the recess.

11. The drilling tool according to claim 1, further including the inserts which are fixed in respective ones of the pockets; each of the inserts including a rounded wall engaging an abutment surface of its respective pocket.

12. The drilling tool according to claim 11 wherein each of the inserts includes a substantially linear cutting edge situated opposite its rounded rear wall.

* * * * *